June 28, 1960 W. F. HUCH 2,942,804
BALLOON END FITTING
Filed Sept. 27, 1955
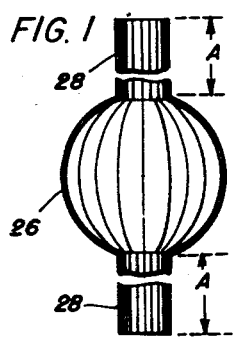
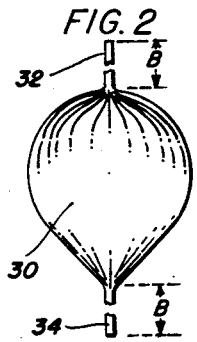
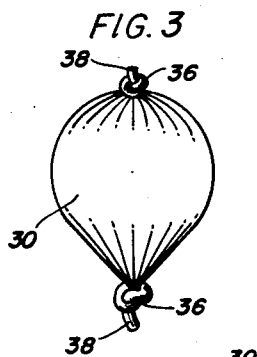
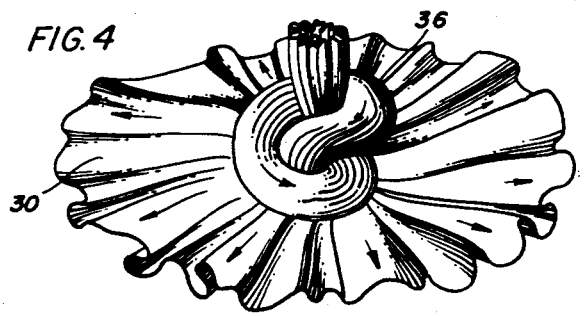
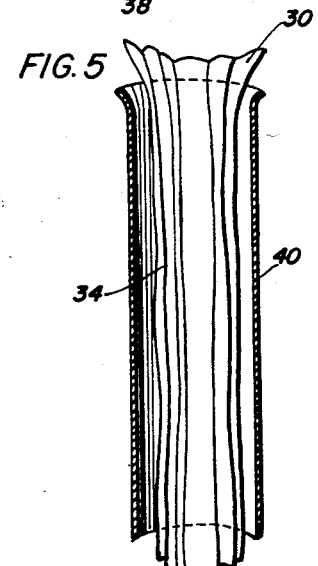
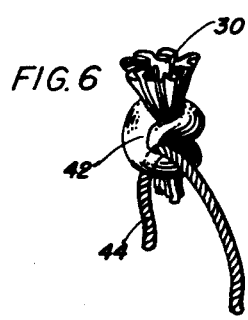
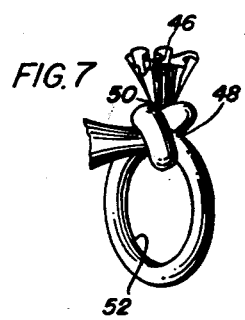
INVENTOR:
WILLIAM F. HUCH
BY
ATT'YS

United States Patent Office 2,942,804
Patented June 28, 1960

2,942,804
BALLOON END FITTING

William F. Huch, St. Paul, Minn., assignor, by mesne assignments, to the United States of America as represented by the Secretary of the Navy Filed Sept. 27, 1955, Ser. No. 537,080

10 Claims. (Cl. 244—31)

This invention relates to balloons and more particularly to an improved end fitting for balloons of the multiple gore or section type usually made of longitudinally extending thermoplastic strips or gores secured together at their side edges. In the past, the gores at one or each end of the balloon have been gathered and clamped in annular formation by and between inner and outer clamp rings, with in some cases a cap sheet clamped between the rings and extending over the inner ring. At the top of the balloon the gores so clamped are subject to superpressure of the lift gas, tending to pull the gores out of the clamp, and whatever load is carried by the balloon also has this effect whether the clamp mechanism is at the top or bottom, or both, of the balloon. In some gored balloons all of the gores are rectangular; these are sometimes referred to as cylinder type balloons. Since some balloons, particularly for high altitude flight, are of large diameter, in many cases exceeding 100 feet, there is so much material to be gathered at the ends that some such arrangement as the clamping mechanism referred to above is a necessity for the top and bottom of the balloon in its final form. Where the gored balloon is spherical between its ends, the gores are identical but the ends are rectangular to assume a cylindrical form of reduced diameter and these end portions have been made relatively short and have been clamped in some such manner as that described above. Another type of gored balloon is spherical at the top and conical at the bottom, and the top is clamped and closed in some such manner as is noted above.

Aside from the possibility of slippage of the material from the clamping mechanism, the clamping members add appreciably to the weight to be lifted, the time consumed in making the balloon, and the cost of the balloon.

The present invention has for one of its objects to provied a balloon end fitting devoid of one or more of the disadvantages noted above.

A further object is to provide a balloon end fitting which is substantially stronger than the inflated part of the balloon.

Another object is to provide a balloon having one or both ends closed without additional means.

It is also an object to provide a balloon end construction which does not substantially add to the weight of the balloon.

An additional object is to provide an improved balloon end fitting which is leak-proof and affords means for suspending a load.

It is a further object to provide a balloon end fitting which is not weakened by the load.

It is another object to provide a gored balloon with extra material at one or both ends for tying a leak-proof knot or knots therewith.

Other objects of the invention will appear in the specification and will be apparent from the accompanying drawings in which Fig. 1 is a sectional view of a spherical balloon with reduced extremities of length sufficient to form a knot in each reduced end;

Fig. 2 is an elevational view of a semispherical gored balloon with reduced extremities of considerable length;

Fig. 3 shows a semispherical balloon in accordance with Fig. 2 in which the reduced extremities have been gathered and formed with end-sealing knots;

Fig. 4 is an enlarged perspective view of a knot in the gathered fabric at one end of a balloon;

Fig. 5 is a sectional elevation of a gathered balloon extremity enclosed in a longitudinal sleeve and of a length to form a knot therein;

Fig. 6 is a sectional view showing in perspective a knot at the bottom of a balloon, with an attached loop for suspending a load; and Fig. 7 is similar to Fig. 6 but shows, as a part of the knot, a loop from which a load may be suspended.

A spherical balloon 26 as shown in Fig. 1 is formed with reduced cylindrical end extensions 28 each of a length A sufficient to form a complete knot in the material of which the balloon is made by gathering each extension and knotting it upon iself. Likewise in a semispherical balloon 30 as shown by Fig. 2 the upper and lower ends 32 and 34 may be extended for a length B which is sufficient to form a knot 36 of the end material as shown in Fig. 3. The knot which is contemplated is a simple knot as shown in the enlarged view, Fig. 4, with the reduced end gathered tightly to form a rope of the material which may be easily knotted upon itself with an extending extremity 38 (Fig. 3) to provide enough material for tying it in the first place and for holding it against slipping when the knot has been tied.

Instead of relying entirely upon the material of the balloon in forming a knot, a sleeve 40 of the same or a different material may be placed over the reduced end as 34, either closely or loosely, confining the gathered material of the balloon and this material is tied in with the knot as an aid in tying it and, for some materials, against slippage or local failure in rubbing as it tightens. The sleeve is placed over the balloon fabric before the knot is tied.

In a knot 42 formed either with or without a sleeve as 40 surrounding the fabric, a supporting or holding line 44 (Fig. 6) may be included in the knot itself, which may be used for an anchor line or for a load support for the balloon.

In a balloon 46 having a sufficiently lengthy rope of gathered end material 48, a more complex knot 50 may be formed with a loop 52 (Fig. 7) as a part thereof which may be used as a means of attachment for a guy line or a load support in accordance with well-known balloon practice.

By entering the knot as a rope, the fabric is aligned for equal longitudinal stress, and the strength of the knot is substantially greater than the bursting strength of the inflated fabric, the ratio of these strengths being $2\pi$.

As different knots have different advantages, any of the variety of standard knots may be used. It is important, however, that some knot be selected which does not slip for the material being used. Depending upon the length of the cylinder extension which is provided and the cylinder diameter, more complex knots may be used which provide for the attachment of load supports or in which the load supports are formed as in Fig. 7.

While some variations of this balloon end fitting and the method of making it have been described in some detail, they should be regarded as examples or embodiments of the invention and not as restrictions or limitations thereof as many changes may be made in the construction and arrangement of the parts without departing from the spirit and scope of the invention.

I claim:

1. A balloon envelope comprising a plurality of gores of thermoplastic material secured together at and throughout their longitudinal edges, said gores being wider at their intermediate portions than at their end portions, said envelope being inflated at said intermediate portions, said end portions being gathered together in the form of ropes, each rope being tied upon itself in a knot providing a leak-proof end fitting at each end of said envelope, and a sleeve of plastic resilient material surrounding one of said ropes and forming a part of the knot in said rope.

2. A balloon envelope comprising a plurality of thermoplastic gores secured together and having reduced end portions gathered together in a rope-like extension, said extension being tied in a knot and a load-support attaching loop, and a long plastic resilient sleeve surrounding said extension and included therewith in the formation of said knot and loop, said sleeve protecting said knot and loop against slippage and local failure as said knot tightens.

3. A balloon envelope comprising a plurality of gores of thermoplastic material secured together at and throughout their longitudinal edges, said envelope being inflated and having a tubular end portion gathered in the form of a rope and tied upon itself in a knot providing a leak-proof end fitting, and a sleeve of plastic resilient material surrounding said rope and forming a part of the knot in said rope.

4. A balloon envelope comprising a plurality of thermoplastic gores secured together and having a tubular end portion gathered in a rope-like extension, said extension being tied into a leak-proof knot and a load-support attaching loop, and a long plastic resilient sleeve surrounding said extension and included therewith in the formation of said knot and loop, said sleeve protecting said knot and loop against slippage and local failure as said knot tightens.

5. A high altitude balloon envelope formed of elongated thermoplastic film gores whose ends are respectively at the top and bottom of the envelope, the gores at an end portion of the envelope defining a cylindrical tube formed of rectangular portions whose major sides are parallel to the tube axis, a flexible sleeve embracing the tube and providing with the tube a rope-like extension tied upon itself into a leak-proof knot with the gores substantially untwisted where they enter the knot.

6. A high altitude balloon envelope formed of plastic film and having upper and lower end portions, one of said portions being gathered into an elongated untwisted rope-like formation, said formation being tied upon itself into a knot, the film being untwisted where it enters the knot, whereby the envelope at said one portion is reinforced against the stresses imposed thereon when the balloon is airborne, and a plastic film sleeve embracing the formation and included in the knot.

7. The structure of claim 6, characterized in that the knotted formation and sleeve constitute the sole reinforcing means for said one end portion of the envelope.

8. A high altitude balloon envelope having means at the bottom thereof for suspending a load, said envelope being formed of elongated seamed plastic film goring and having upper and lower end portions, said envelope being devoid of load tapes between said portions, one of said portions being gathered into an elongated untwisted rope-like formation, said formation being tied upon itself into a knot, the film being untwisted where it enters the knot, said knot being gas-tight and capable by itself of withstanding all of the stresses imposed thereat by the lift gas and load when the balloon is airborne, whereby the need of load tapes between said portions is obviated.

9. A high altitude balloon envelope having means at the bottom thereof for suspending a load, said envelope being formed of elongated seamed plastic film goring and having upper and lower end portions, said envelope being devoid of load tapes above said lower end portion, said upper end portion being gathered into an elongated untwisted rope-like formation, said formation being tied upon itself into a knot, the film being untwisted where it enters the lower end of the knot, said knot being gas-tight and capable by itself of withstanding all of the stresses imposed thereat by the lift gas and load when the balloon is airborne.

10. A high altitude balloon envelope formed of elongated seamed plastic film goring and having upper and lower end portions, each of said portions being gathered into an elongated untwisted rope-like formation, each formation being tied upon itself into a knot, said envelope being devoid of load tapes above said lower end portion, and load-suspending means connected with the lower knot, the film being untwisted where it enters each knot, said knots being gas-tight and capable by themselves of withstanding all of the stresses imposed thereat by the lift gas and load when the balloon is airborne.

References Cited in the file of this patent

UNITED STATES PATENTS

| | | |
|---|---|---|
| 1,341,272 | Jordahn | May 25, 1920 |
| 1,612,643 | Mulholland | Dec. 28, 1926 |
| 1,745,576 | Kempian | Feb. 4, 1930 |
| 2,409,486 | Hagen | Oct. 15, 1946 |
| 2,602,609 | Huch | July 8, 1952 |
| 2,682,903 | Gay | July 6, 1954 |
| 2,759,296 | Freck | Aug. 21, 1956 |

FOREIGN PATENTS

| | | |
|---|---|---|
| 268,584 | Great Britain | Apr. 7, 1927 |
| 352,200 | Great Britain | July 9, 1931 |
| 585,577 | Germany | Oct. 5, 1933 |